E. J. FUTTERER.
SYSTEM OF OPERATING SAFETY APPLIANCES ON ELECTRIC CARS AND OTHER VEHICLES.
APPLICATION FILED SEPT. 18, 1919.
1,397,205.
Patented Nov. 15, 1921.
2 SHEETS—SHEET 1.
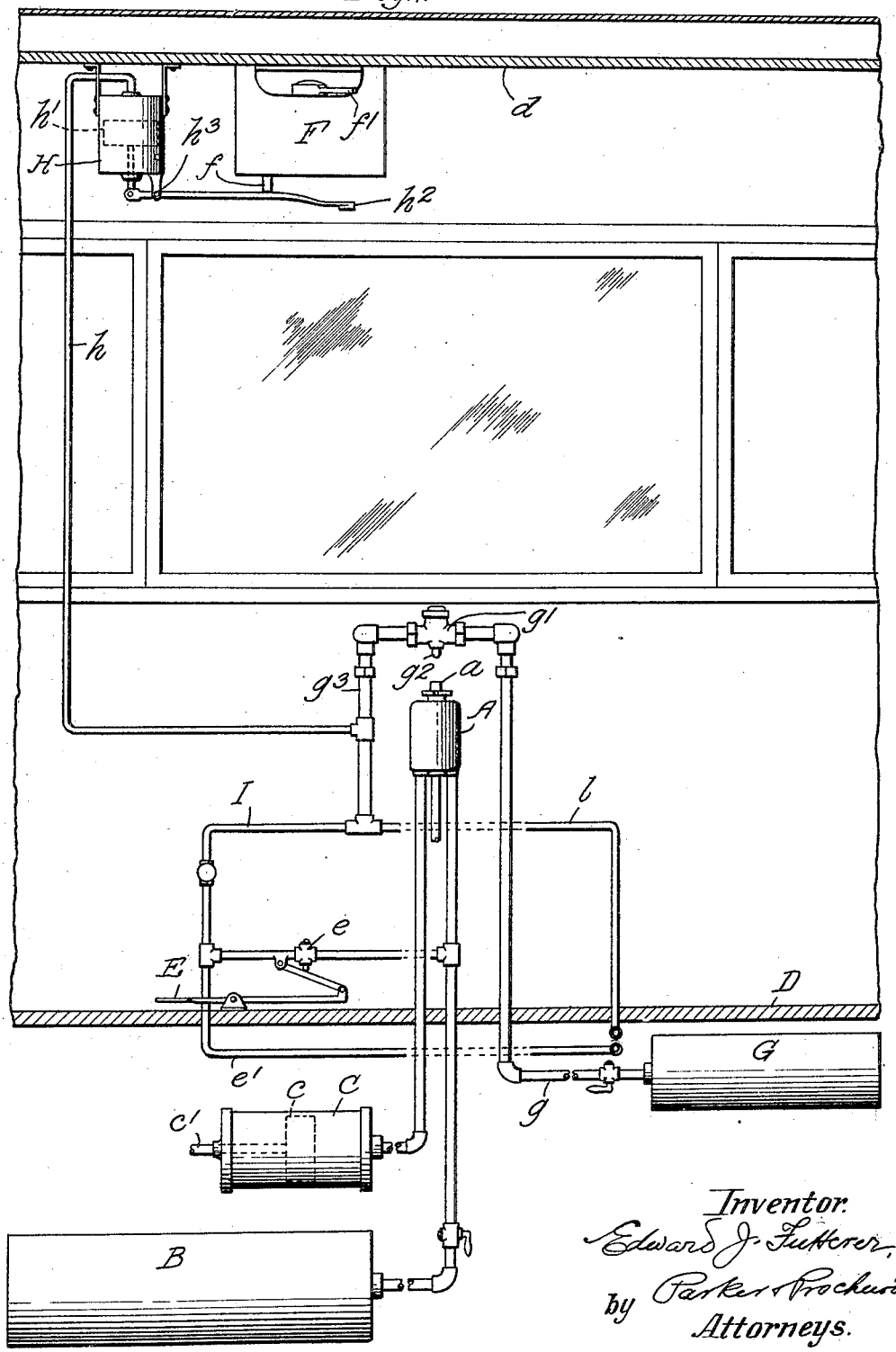

E. J. FUTTERER.
SYSTEM OF OPERATING SAFETY APPLIANCES ON ELECTRIC CARS AND OTHER VEHICLES.
APPLICATION FILED SEPT. 18, 1919.
1,397,205.
Patented Nov. 15, 1921.
2 SHEETS—SHEET 2.
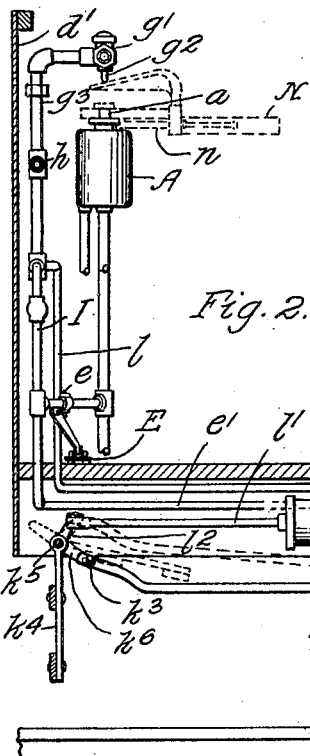
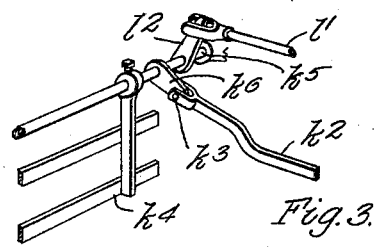
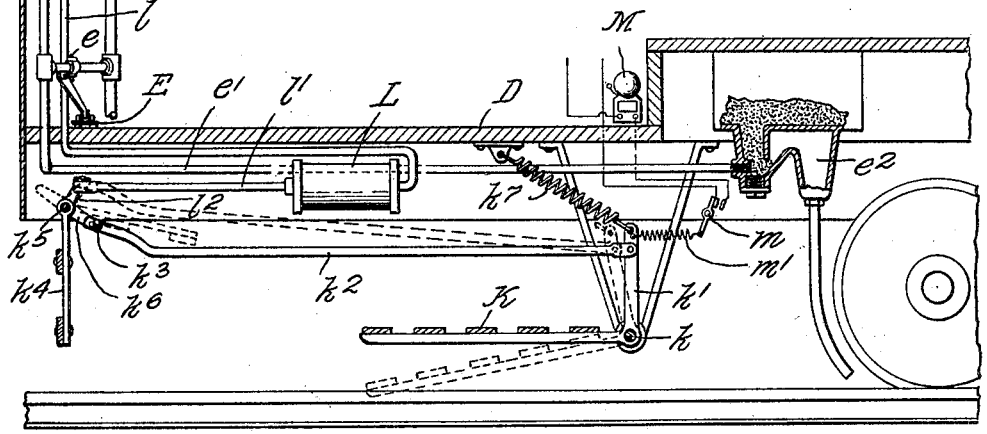
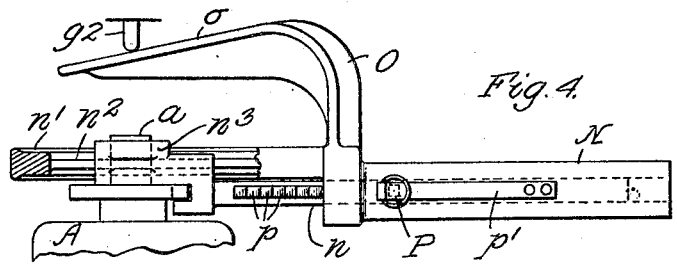
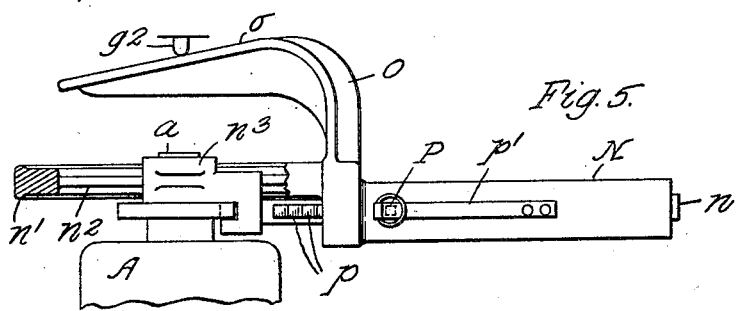
Inventor.
Edward J. Futterer.
by Parker & Cochran
Attorneys.

UNITED STATES PATENT OFFICE.

EDWARD J. FUTTERER, OF BUFFALO, NEW YORK.

SYSTEM OF OPERATING SAFETY APPLIANCES ON ELECTRIC CARS AND OTHER VEHICLES.

1,397,205.   Specification of Letters Patent.   Patented Nov. 15, 1921.

Application filed September 18, 1919. Serial No. 324,269.

*To all whom it may concern:*

Be it known that I, EDWARD J. FUTTERER, a citizen of the United States, residing at Buffalo, in the county of Erie and State of New York, have invented a new and useful Improvement in Systems of Operating Safety Appliances on Electric Cars and other Vehicles, of which the following is a specification.

This invention relates to systems or devices for operating safety appliances, such as life guards, sanding devices, alarms, circuit breakers, or analogous appliances, in such a manner as to avoid accidents.

Accident-preventing appliances as commonly used on street railway cars or locomotives usually require the motorman or operator to actuate a plurality of devices successively in quick time, and frequently in the haste and confusion the operator forgets or neglects to operate one or more necessary appliances. Automatic devices have been introduced for simultaneously actuating all or most of the safety appliances and the emergency brake, but such appliances have had but very limited use since, in order to use the safety appliances with these automatic devices, the emergency brakes must also be applied. It is however, frequently desirable to actuate all of the safety appliances without using the emergency brakes, and many accidents can be prevented by actuating the accident-preventing devices independently of the brakes.

The objects of the invention are to produce a system of this kind by means of which the various safety appliances can be actuated by the motorman or engineer without taking his hands away from the brake or controller handles, and in which the application of the brakes is under the control of the motorman or operator independently of the actuation of the safety appliances; also to provide an actuating handle of improved construction for controlling the application of the safety appliances; also to provide a system or device of this kind in which the safety appliances remain in their safety positions until positively restored to their normal positions; also to improve systems or devices of this kind in other respects hereinafter specified.

In the accompanying drawings:

Figure 1 is a transverse sectional elevation of the front vestibule of the car, showing diagrammatically a system embodying the invention.

Fig. 2 is a longitudinal sectional elevation of the lower front end of a car provided with a system embodying the invention.

Fig. 3 is a fragmentary perspective view showing a part of the mechanism for lowering the life guard.

Fig. 4 is a sectional elevation on an enlarged scale, showing a handle for controlling the operation of the system.

Fig. 5 is a similar view thereof, showing the handle in a position in which the safety appliances are actuated.

The system embodying this invention is preferably placed in operation by means of an auxiliary handle arranged in operative relation to the air brake handle of the usual air brake system of a car, locomotive or other vehicle but if desired, the auxiliary handle may be used in connection with the controller, throttle or other device for controlling the movement of the vehicle. In the construction shown in the drawings A represents the usual valve housing of the air brake which is arranged in a place convenient for the operator and which is provided with the valve stem $a$ by means of which the air valve may be opened and closed for controlling the admission of air from the main air reservoir or drum B to the brake cylinder C, the piston $c$ of which being connected by means of a piston rod $c'$ to the usual brake mechanism. (Not shown.) All of these parts may be mounted in any desired position on the vehicle, being shown in the construction illustrated in the front vestibule of an electric car having a floor D, a ceiling $d$ and the usual front wall or dash $d'$. These vehicles are also usually provided with a foot pedal or the like E suitably arranged on the floor of the car and adapted to open the valve $e$ for admitting air from the main air pipe which leads from the reservoir B to the valve housing A to a pipe line $e'$ which is connected with the usual sand valve $e^2$, whereby the motorman can cause sand to be spread upon the tracks. The electrical or other connections for propelling the car or the locomotive are not shown, with the exception of the usual circuit breaker F arranged in the ceiling of the vestibule or cab and which is provided with the usual pin or rod $f$ which may be pushed upwardly for opening the circuit breaker and with a handle $f'$ by means of which the breaker may be closed. All of these parts have heretofore been used in electrically propelled cars and of themselves constitute no part of this invention.

G represents a supplemental or auxiliary air reservoir or drum which receives a supply of air for actuating the system embodying the invention. This drum is used for the purpose of insuring at all times a supply of air for the system, so that the operation of the system will not be dependent upon the air pressure in the main reservoir. If desired, however, air from the main reservoir may be used for actuating the system. The supplemental reservoir may receive air from any suitable source not shown. This reservoir is connected by means of a pipe $g$ to a valve housing $g'$, containing a valve having a stem $g^2$ extending into operative relation to the auxiliary brake handle. The air brake handle is supplied with an auxiliary handle hereinafter to be described, which may be actuated to push the stem $g^2$ into the valve housing and thus release air from the auxiliary reservoir G into a pipe $g^3$ from which the air is distributed to the various safety appliances.

Any number of safety appliances may be employed and may be connected with the pipe $g^3$ so that a single movement of the auxiliary handle will actuate all of the safety appliances with the exception of the air brake. In the construction shown the air from the pipe $g^3$ actuates simultaneously a motor which breaks the supply of electric current to the car through the medium of the circuit breaker F, which admits air into the sand valve for sanding the tracks, which causes the life guard to be dropped into its operative position and which causes the actuation of an alarm gong. Any other safety appliance may be actuated by means of the air admitted into the pipe $g^3$.

The breaking of the circuit supplying power to the vehicle is effected by means of a cylinder H, Fig. 1, connected by means of a pipe $h$ to the pipe $g^3$ and which contains a piston $h'$ which in the construction shown is forced downwardly by the air when the valve stem $g^2$ is actuated. This piston is connected to a lever $h^2$ pivoted to a suitable support or standard as at $h^3$ and extending into operative relation to the pin or rod $f$ of the circuit breaker so that when air is admitted to the cylinder H, the lever $h^2$ will be swung about its pivot to push the pin or rod $f$ upwardly, causing the circuit breaker to be opened.

The spreading of sand on the track is preferably effected by means of a pipe or passage I connecting the pipe $g^3$ with the pipe $e'$ of the sanding appliance so that when the valve stem $g^2$ is actuated the air passes through the pipe $g^3$ and into the pipe or passage I to the pipe $e'$ and spreads sand on the track independently of the foot pedal E and the valve $e$ controlled thereby.

K represents the life guard which may be of any suitable or desired construction and which extends crosswise of the tracks in such a manner that when dropped it will pick up any object on the tracks and prevents the wheels of the car from passing over the same. The life guard is pivoted at its opposite ends, as shown at $k$ on suitable brackets or supports suspended from the car body and when the car is operating in a normal manner the life guard occupies the position shown in full lines in Fig. 2. Each side of the life guard is provided with an upwardly extending arm $k'$ to which a link $k^2$ is pivotally connected. The link extends forwardly and the front end thereof is pivoted at $k^3$ to an arm or extension $k^6$ of a tripping device $k^4$ pivoted at $k^5$ on the body of the car, the arm $k^6$ extending in such a manner that when the life guard is in its normal or inoperative position the pivotal connection $k^3$ between the link $k^2$ and arm or extension $k^6$ will be below the dead center position, the tripping device $k^4$ being held against movement forwardly from the position shown in Fig. 2. The arm $k'$ of the life guard is preferably also drawn forwardly by means of a spring $k^7$. When an object on the tracks strikes the tripping device $k^4$ it will be swung rearwardly moving the arm $k^6$ upwardly past the dead center, whereupon the weight of the life guard $k$ and the spring $k^7$ will swing the life guard downwardly to the position shown in dotted lines in Fig. 2 so that the object on the track will be picked up by the life guard. Life guards of this kind are commonly used and of themselves constitute no part of this invention.

In order to cause the air from the pipe $g^3$ to actuate the life guard, the pipe $g^3$ is connected by means of a pipe or passage $l$ to a cylinder L containing a piston connected with the rod $l'$ to an arm $l^2$ of the life guard tripping device $k^4$. The admission of air to the cylinder L will move the piston forwardly, as shown in Fig. 2 and cause the arm $l^2$ to swing forwardly, thus swinging the arm $k^6$ and the link $k^2$ beyond the dead center position and causing the life guard to drop into the position shown in dotted lines in Fig. 2.

The alarm device is represented by a gong or bell M which may be mounted in any desired part of the vehicle to warn pedestrians or others of the approach of the vehicle. This gong may be placed into operation by the actuation of the valve stem $g^2$ through any desired intermediate means or mechanism. In the construction shown the gong is actuated when an electric switch $m$ is closed and the switch is connected by means of a spring or link $m^2$ with the arm $k'$ of the life guard. Consequently, when the life guard is swung down into its operative position the switch $m$ will be closed, thus causing the actuation of the gong or alarm M.

The auxiliary handle by means of which the valve stem $g^2$ is actuated, may be of any desired construction, being shown in the accompanying drawings as slidably mounted on the handle $n$ of the air brake system. The auxiliary handle consists of a grip portion N which practically surrounds the air brake handle and which is adapted to be grasped by the operator in driving the vehicle. The auxiliary handle is preferably provided with an extension $n'$ having a longitudinal guide slot $n^2$, which coöperates with the hub portion $n^3$ of the air brake handle to guide the auxiliary handle in its sliding movement relatively to the air brake handle. The auxiliary handle is provided with a cam projection O having a cam face $o$ which is so arranged that when the auxiliary handle is in its outer position, as shown in Fig. 4, the valve stem $g^2$ will be in its normal or closed position. When the auxiliary handle is pushed inwardly toward the axis of rotation of the air brake handle the cam face $o$ forces the valve stem $g^2$ upwardly and causes the actuation of the safety appliances. It will be seen, therefore, that in order to actuate the safety appliances it is only necessary to move the auxiliary handle inwardly lengthwise of the air brake handle. The grip portion of the auxiliary handle being always in the grasp of the operator in operating the car, it is not necessary for him to remove his hand from the air brake handle and after pressing the auxiliary handle inwardly the operator actuates the air brakes in the usual manner. By means of this system the air brakes can be applied at the discretion of the operator, and since very frequently it is necessary to use emergency air brakes, the operator can stop the car in such a manner as to avoid injury to its passengers or contents. At the same time the operator never loses control of the car while he is actuating the safety appliances, as would be necessary in cases where the operator must actuate the various safety appliances one at a time.

It is desirable to provide means for holding the auxiliary handle in its operative position until positively released. In order to accomplish this result the air brake handle $n$ is provided with a plurality of ratchet teeth $p$ with which a dog or the like P is pressed into engagement by means of a spring $p'$. By means of this arrangement, in case of accident, it can be positively ascertained whether or not the various safety appliances were actuated and the memory of witnesses to an accident is not depended upon to prove whether or not the necessary safety appliances were actuated. This is particularly desirable in case of negligence suits, where frequently the question as to whether or not the safety appliances were actuated is of vital importance.

By means of a system of this kind the possibility of negligence on the part of the operator of a car or other vehicle is reduced to a minimum and the actuation of the various safety appliances is greatly simplified and does not require the operator to remove his hand from either the controller or air brake handle. This makes it possible to bring the car quickly to a stop without employing the emergency brakes, since the actuation of the accident-preventing devices in no way delays the application of the brakes in the usual way.

I claim as my invention:

1. In a safety system for electric cars or the like, the combination with a brake-controlling device, of one or more safety appliances, and an actuating member arranged on said brake-controlling device and which is gripped by the operator when holding said brake-controlling device and by means of which said safety appliances may be actuated independently of the position of said brake-controlling device, said actuating member being so associated with the brake-controlling device as to be influenced by the inertia of the operator when the speed of the car is suddenly checked to automatically tend to actuate said safety devices.

2. In a safety system for electric cars or the like, the combination with a brake system and a brake-controlling handle, of a plurality of safety appliances on said car, means for causing the actuation of said safety appliances, independently of the actuation of said brake system and, including an air valve arranged in operative relation to said brake handle, a device movable lengthwise of said brake handle to actuate said valve for causing said safety appliances to operate, and means for releasably holding said device in the valve-actuating position.

3. In a safety system for electric cars or the like, the combination with a brake-controlling device, of a plurality of safety appliances, an actuating member arranged on said brake-controlling device and adapted to be actuated by an operator for actuating all of said safety appliances simultaneously and independently of the position of the brake-controlling device, and means for releasably holding said safety appliances in their actuated positions until positively released.

4. In a safety system for electric cars or the like, the combination with a brake system and a brake-controlling handle, of a plurality of safety appliances on said car, means for causing the actuation of said safety appliances independently of the actuation of said brake system, said means including an air valve arranged in operative relation to said brake handle, and a device slidably mounted on said brake handle and movable thereon toward and from said air valve, said device having a part engaging and actuating said air valve in one or more positions of said device on said handle.

5. In a safety system for electric cars or the like, the combination with a brake system and a brake-controlling handle, of a plurality of safety appliances on said car, means for causing the actuation of said safety appliances independently of the actuation of said brake system, said means including an air valve arranged in operative relation to said brake handle, and a device mounted for horizontal movement on and relatively to said brake handle, said device including a part engaging and actuating said air valve in one or more positions of said device on said handle.

Witness my hand this 27th day of August, 1919.

EDWARD J. FUTTERER.

Witnesses:
 LEWIS H. STICKLE,
 REDMOND J. WALSH.